Patented Apr. 10, 1934

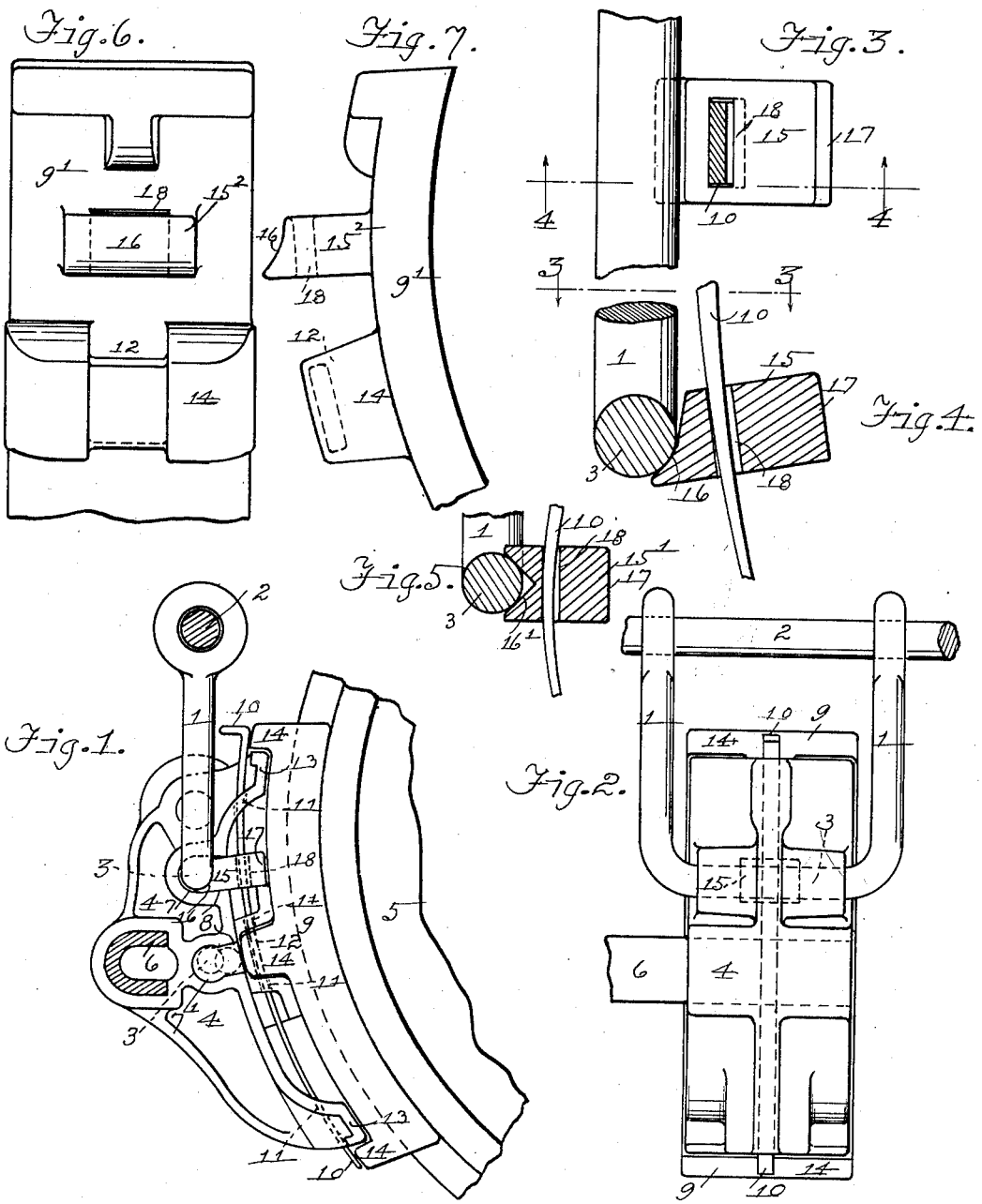

1,954,254

UNITED STATES PATENT OFFICE 1,954,254

BRAKE

Robert R. Mauk and Thomas A. Crowder, Grand Rapids, Mich.

Application September 22, 1932, Serial No. 634,270

4 Claims. (Cl. 188—211)

The present invention relates to brakes for railway cars and the like; and its object is, generally, to provide a brake structure improved in respects hereinafter appearing; and more particularly, to provide means whereby brake blocks with their brake shoes are adapted to be suspended at different levels; and further, to provide adapting means whereby brake blocks of existing usual form may be suspended at different levels.

These and any other and more specific objects hereinafter appearing are attained by, and the invention finds preferable embodiment in, the structure particularly described in the body of this specification and illustrated by the accompanying drawing, in which:

Figure 1 is an elevational side view of a brake structure and adjacent portion of a car wheel;

Figure 2 is a rear view of said structure;

Figure 3 is a plan view of parts of the same, partially sectioned horizontally on line 3—3 of Figure 4;

Figure 4 is a vertical sectional view of said parts taken on line 4—4 of Figure 3;

Figure 5 is a vertical sectional view of like parts (reduced in size), showing a modified construction;

Figure 6 is a rear view of a part of the structure showing a modified construction thereof; and Figure 7 is a side view of said part.

In the embodiment of the invention illustrated by these drawing is shown a brake structure for railway cars, including a brake hanger having a pair of arms 1 depending from a pivotal mounting, the round bar 2, on the car, these arms being connected by a horizontal wrist portion 3 in the usual manner. A pair of brake blocks 4 (one for each of the wheels 5 at the opposite sides of the car) are connected by the brake bar 6 and each is supported turnably on said wrist portion which is received into a recess-bearing 7 or $7^1$ in the inner side of the brake block, these recess-bearings being open at 8 toward the brake shoe 9 detachably connected to the brake block as by the key 10 removably inserted through aligned openings 11 in the brake block and 12 in the brake shoe. Said block and shoe have lugs or extensions 13 and 14 respectively, in approximately fitting relation in the assembled position of said parts as shown in Figure 1.

The brake blocks as usually made have the lower recess-bearing $7^1$ in which the wrist portion 3 is inserted through its open side 8 to mount the brake block, etc. on the car, and when the brake shoe is secured in position by said key, the shoe's middle lug or extension 14 overlies this open side 8 and holds the wrist portion (indicated in dotted lines in Figure 1) in the recess-bearing $7^1$. The brake blocks commonly have also the upper recess 7 formed therein, and inasmuch as it is sometimes found desirable to hang the brake block lower, the wrist portion 3 is removed from recess bearing $7^1$ and inserted into this recess 7 which then forms the bearing therefor; but in this disposition of the parts, there is nothing to hold the wrist portion in such recess-bearing 7 unless it be the key 10 which is spaced a considerable distance from the brake block; and in the braking operation of the structure said wrist portion may be forced against this key with great tendency to fracture or deform the same.

In order to adapt such brake blocks to such a lower hung position in which the wrist portion is seated and bears in the upper recess 7, we provide a separate stop member 15 between the brake block and the brake shoe and having an end portion 16 extending into the open side 8 of the recess-bearing and into abutting relation with the wrist portion therein. This stop member's opposite end portion 17 is in abutting relation with the brake shoe, or so nearly so that the forced movement of said stop member to such abutting relation with the shoe will spring the key 10 only slightly, this key passing through an opening 18 in the stop member aligned with the openings 11 and 12, to assemble said member with the shoe and block. It will be seen that the key 10 being springable will urge this stop member into contact with the wrist portion 3 and thus prevent rattling motion thereof as indicated in Figures 4 and 5.

In the modified construction shown in Figures 6 and 7, the brake shoe $9^1$ has the stop member $15^2$ formed integrally therewith. In the stop members 15, $15^2$ the end portion 16 is inclined as shown to provide a slightly wedging contact with the wrist portion 3; and in Figure 5 the end portion $16^1$ has oppositely inclined surfaces receiving the wrist portion between them. These inclined end portions serve to hold the engaging parts in proper vertical relation and to prevent their rattling motion.

The invention being intended to be pointed out in the following claims, is not to be limited to or by details of construction of any particular embodiment thereof illustrated by the drawing or hereinbefore described.

We claim:

1. In a structure of the character described: a brake hanger having a wrist portion; a brake shoe; a brake block detachably carrying the shoe and having a recess-bearing, open toward the shoe, containing the wrist portion; a horizontally elongated stop member between and separate from the shoe and the block, having an end portion in abutting relation with the wrist portion within the recess to hold the same therein; means extending through the stop member for detachably connecting the stop member to the block.

2. In a structure of the character described: a brake hanger having a wrist portion; a brake shoe; a brake block detachably carrying the shoe and having a recess-bearing, open toward the shoe, containing the wrist portion; a stop member between and separate from the shoe and the block, having an end portion in abutting relation with the wrist portion within the recess to hold the same therein; means for detachably connecting the stop member to the block comprising a key removably extending through aligned openings therein.

3. In a structure of the character described: a brake hanger having a wrist portion; a brake shoe; a brake block detachably carrying the shoe and having a recess-bearing, open toward the shoe, containing the wrist portion; a stop member between and separate from the shoe and the block, having an end portion in abutting relation with the wrist portion within the recess to hold the same therein; means for detachably connecting the stop member to the block and the shoe comprising a key removably extending through aligned openings in the shoe, the block and the stop member.

4. In a structure of the character described: a brake hanger having a wrist portion; a brake shoe; a brake block detachably carrying the shoe and having a recess-bearing, open toward the shoe, containing the wrist portion; a stop member between and separate from the shoe and the block, having an end portion in abutting relation with the wrist portion within the recess to hold the same therein; means for detachably connecting the stop member to the block and the shoe comprising a key removably extending through aligned openings in the shoe, the block and the stop member, the key being resilient urging the stop member into contact with the wrist portion.

ROBERT R. MAUK.
THOMAS A. CROWDER.